United States Patent [19]

Sorimachi et al.

[11] Patent Number: 5,508,080
[45] Date of Patent: Apr. 16, 1996

[54] FLEXIBLE LAMINATED SURFACE MATERIAL AND METHOD OF PRODUCING THE SAME

[75] Inventors: Yuuichi Sorimachi; Hidemi Itatani; Takashi Hirose, all of Toyota; Toshiitsu Iwai, Seto; Youichi Fujiyama, Nagoya; Haruo Kato, Aichi; Keiichiro Ohtsuka, Nagahama, all of Japan

[73] Assignees: Takashimaya Nippatsu Kogyo Co. Ltd., Aichi; Ohtsuka Sangyo Material Co. Ltd., Shiga, both of Japan

[21] Appl. No.: 301,644

[22] Filed: Sep. 7, 1994

[30] Foreign Application Priority Data

Feb. 17, 1994 [JP] Japan ................................ 6-020554
May 11, 1994 [JP] Japan ................................ 6-097382

[51] Int. Cl.⁶ .................................................. B32B 3/02
[52] U.S. Cl. ........................ 428/86; 156/148; 156/291; 156/297; 428/110; 428/198; 428/234; 428/246; 428/247; 428/253; 428/284; 428/299; 428/300; 428/218; 428/920; 428/921
[58] Field of Search .......................... 428/198, 246, 428/247, 284, 300, 86, 110, 234, 253, 920, 921, 299, 218; 156/148, 291, 297

[56] References Cited

U.S. PATENT DOCUMENTS

| | | | |
|---|---|---|---|
| 4,034,134 | 7/1977 | Gregorian et al. | 428/86 |
| 4,088,805 | 5/1978 | Wiegand | 428/310 |
| 4,808,465 | 2/1989 | Vane | 428/233 |
| 4,851,274 | 7/1989 | D'Elia. | |
| 5,198,278 | 3/1993 | Sumimoto et al. | 428/95 |
| 5,236,771 | 8/1993 | Groshens. | |

FOREIGN PATENT DOCUMENTS

| | | |
|---|---|---|
| 58-101052 | 6/1983 | Japan. |
| 60-160251 | 10/1985 | Japan. |
| 61-108547 | 5/1986 | Japan. |
| 63-42191 | 3/1988 | Japan. |
| 63-78092 | 5/1988 | Japan. |
| 63-159562 | 7/1988 | Japan. |
| 64-38797 | 2/1989 | Japan. |
| 1-103400 | 7/1989 | Japan. |
| 2-3947 | 1/1990 | Japan. |
| 3-189250 | 8/1991 | Japan. |
| 4-285582 | 10/1992 | Japan. |
| 4-332589 | 11/1992 | Japan. |
| 4-332590 | 11/1992 | Japan. |
| 5-15899 | 3/1993 | Japan. |
| 5-269031 | 10/1993 | Japan. |

Primary Examiner—James J. Bell
Attorney, Agent, or Firm—Oliff & Berridge

[57] ABSTRACT

A flexible laminated surface material has an outer material and a laminate wadding composed of a fibrous web and a nonwoven fabric sheet that are together needle punched. Parts of filaments of the web penetrate through the nonwoven fabric sheet, thus forming many small protrusions on the nonwoven fabric sheet. The outer material is adhered, using entire area or spot adhesion techniques, to the nonwoven fabric sheet side of the wadding with a substantial adhesion strength. By varying the amount of the adhesion applied, different types of adhesion can be achieved.

32 Claims, 14 Drawing Sheets

FLEXIBLE LAMINATED SURFACE MATERIAL AND METHOD OF PRODUCING THE SAME

BACKGROUND OF THE INVENTION

1. Field of the Invention

The present invention relates to a flexible laminated surface material and, more particularly, to a flexible laminated surface material for vehicle interiors, such as seats, door trimmings and ceiling trimmings, and for building interiors including furniture, and the like. The present invention also relates to the method of producing the flexible laminated surface material.

2. Discussion of the Prior Art

Many types of flexible laminated surface materials comprise a polyurethane foam layer and an outer fabric material, such as a woven or knitted sheet, as disclosed in, for example, Japanese Utility Model Application Laid-open No. 1-103400, because polyurethane foam has good cushion and voluminousness properties. However, because polyurethane foam has low strength, the outer fabric material needs to have great strength and, therefore, adds substantial cost. Further, polyurethane foam causes some difficulty in the disposal or recycle of the flexible laminated surface materials. In addition, because polyurethane foam has a structure comprising many closed cells, it has considerably low air permeability. Therefore, if a surface material comprising a polyurethane foam layer is used for a seat shell, the seat shell does not allow efficient ventilation.

To solve these problems, Japanese Utility Model Application Laid-open No. 5-15899 and Japanese Patent Application Laid-open No. 4-332590 propose a vehicle interior fibrous surface material comprising a fibrous web, which substitutes for the polyurethane foam layer, and an outer material adhered to the fibrous web. However, this type of interior fibrous surface material suffers from low adhesion. The fluffy surface of the fibrous web requires a considerably large amount of adhesive to achieve a required adhesion strength between the fibrous web and the outer material. If such a large amount of adhesive is used, the texture of the obtained fibrous surface material significantly deteriorates. Further, if a low apparent-density fibrous web is used in this construction, an outer material with a great strength or an additional backing material must be used to achieve a sufficient strength of the surface material. The production cost will thus be increased. As for flame retardation, which is normally required for surface materials, flame retardation of the considerably thick and bulky fibrous web is costly.

SUMMARY OF THE INVENTION

The present invention is intended to solve the abovementioned problems of the conventional flexible laminated surface materials. An object of the present invention is to provide a low-cost flexible laminated surface material comprising a fibrous wadding in place of polyurethane foam, which achieves a substantial strength of adhesion to an outer material, even to a low area weight fabric outer material, without deterioration of the properties of outer materials of various types.

According to one aspect of the present invention, there is provided a flexible laminated surface material comprising a laminate wadding composed of a fibrous web and a supportive sheet which are laminated and integrated by entangling fiber of the fibrous web and fiber of the supportive sheet with each other, and an outer material adhered to the supportive-sheet side of the laminate wadding. The supportive sheet is preferably a nonwoven fabric sheet. Because the laminate wadding is formed of the supportive sheet and the fibrous web, which are integrated by fiber entanglement, for example, needle punching, the laminate wadding has a relatively regular and firm surface suitable for adhesion, compared with the fluffy surfaces of the fibrous web. Therefore, substantially the entire-area high strength adhesion can be achieved between the laminate wadding and the outer material. Further, because the supportive sheet reinforces the laminate wadding, a low area weight outer material can be used without requiring a backing material. Still further, if the supportive sheet is flame retardant, the entire flexible laminated surface material will become sufficiently flame retardant, without needing flame retardation of the fibrous web or other members. Thus, the flexible laminated surface material of the present invention significantly reduces production costs. In addition, if the laminate wadding is adhered to a fabric outer material, the obtained surface material will have significantly high air permeability.

According to another aspect of the present invention, there is provided a flexible laminated surface material, wherein the outer material is adhered to the laminate wadding at a plurality of spots, at each of which a portion of the outer material is adhered to a portion of the laminate wadding. While such spot adhesion achieves a sufficient adhesion strength, the spot adhesion does not substantially deteriorate the texture or stretchability of the outer material. In addition, the spot adhesion increases the air permeability of the flexible laminated surface material.

According to a further aspect of the present invention, there is provided a flexible laminated surface material, wherein a portion of the laminate wadding involved in spot adhesion with the outer material is a peak portion of the protrusion formed of fiber of the fibrous web penetrating through the supportive sheet. In this construction, the fiber of the fibrous web adhered to the outer material is movable, to some extent, relative to the supportive sheet. Thus, the flexible laminated surface material enables the outer material to move and stretch relative to the laminate wadding, achieving strong resistance to peeling of the outer material from the laminate wadding. In addition, the flexible laminated surface material achieves a sufficient adhesion strength between the outer material and the laminate wadding without deteriorating the texture of the outer material.

According to a yet another aspect of the present invention, there is provided a method of producing a flexible laminated surface material, comprising the steps of integrating a supportive sheet with a fibrous web by fiber entanglement to form a laminate wadding, and adhering an outer material to the supportive-sheet side of the laminate wadding with an adhesive by pressing the outer material and the laminate wadding against each other. Preferably, the supportive sheet is integrated with the fibrous web by needle punching. It is also preferred to apply the adhesive to the supportive-sheet side of the laminate wadding by roll coating.

According to still another aspect of the present invention, there is provided a flexible surface material comprising an entangled laminate wadding comprising a fibrous web and a supportive sheet; and an outer material adhered to said laminate wadding, said supportive sheet being disposed between said outer material and said fibrous web.

BRIEF DESCRIPTION OF THE DRAWINGS

Further objects, features and advantages of the present invention will become apparent from the following description of the preferred embodiments with reference to the attached drawings, wherein.

DETAILED DESCRIPTION OF PREFERRED EMBODIMENTS

First Embodiment

Figure 1:
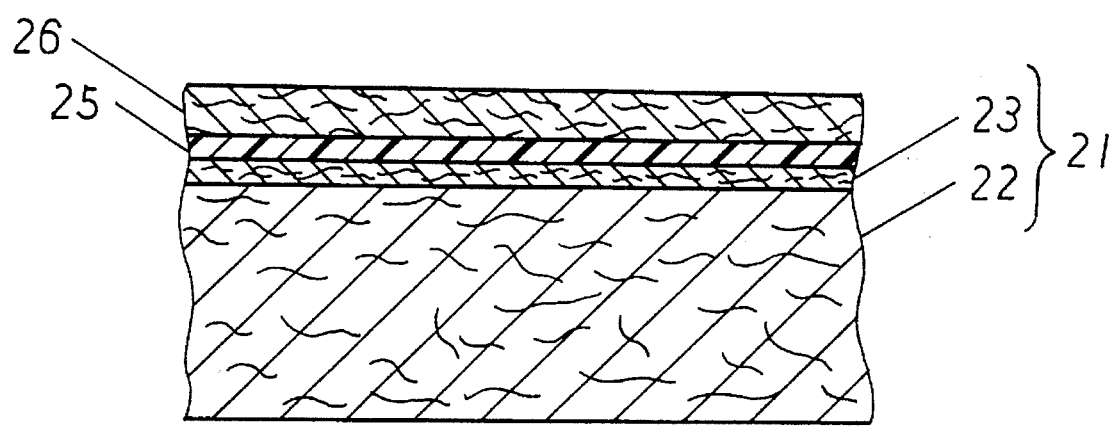
FIG. 1 is a sectional view of a first embodiment of the flexible laminated surface material of the present invention.

A first embodiment of the present invention will be described in detail hereinafter with reference to FIG. 1.

A nonwoven fabric sheet 23 and a fibrous web 22 are laminated and integrated by needle punching to form a laminate wadding 21. The fibrous web 22 is formed of, for example, a polypropylene-type fiber, a polyester-type fiber or a polyamide-type fiber, by tangling the fiber. The fibrous web 22 is preferably about 1 to 20 mm thick and has an area weight of 0.005 to 0.1 g/cm². The thickness of the fibrous web 22 is varied within the range according to the applications of the flexible laminated surface material. If the area weight is less than 0.005 g/cm², variations in area weight and deterioration of the cushion property become significant. If the area weight of the fibrous web 22 is greater than 0.1 g/cm², permanent deformation of the fibrous web 22 becomes significant.

The nonwoven fabric sheet 23 is a commercially available sheet, for example, Spunbonded™ (Du Pont), that is formed of highly abrasion-resistant fiber such as polypropylene-type fiber, polyester-type fiber or polyamide-type fiber. The thickness and area weight of the nonwoven fabric sheet 23 are preferably about 0.1 to 2 mm and about 0.001 to 0.02 g/cm², respectively. The more preferable thickness and area weight of the nonwoven fabric sheet 23 are about 0.1 to 1.0 mm and about 0.001 to 0.01 g/cm², respectively. The value 0.1 mm is generally the smallest thickness of nonwoven fabric sheets that can currently be achieved. The value 0.001 g/cm² is currently the smallest area weight to achieve a sufficient adhesion strength and reasonable production costs. If the area weight of the nonwoven fabric sheet 23 is greater than 0.02 g/cm², the nonwoven fabric sheet 23 becomes too costly.

According to the preferred embodiments, the apparent density of the non-woven fabric sheet 23 is normally higher than the apparent density of the fibrous web 22. The term "apparent density" herein refers to weight per unit volume that includes air volume. Accordingly, apparent density can be obtained by dividing area weight by thickness. In a prototype of the flexible laminated surface material, the nonwoven fabric sheet 23 has an area weight of 0.0015 g/cm² and a thickness of 0.1 mm while the fibrous web 22 has an area weight of 0.015 g/cm² and a thickness of 3.5 mm. The calculated apparent densities of the nonwoven fabric sheet 23 and the fibrous web 22 in this flexible laminated surface material are 0.15 g/cm³ and 0.0429 g/cm³, respectively.

Figure 10:
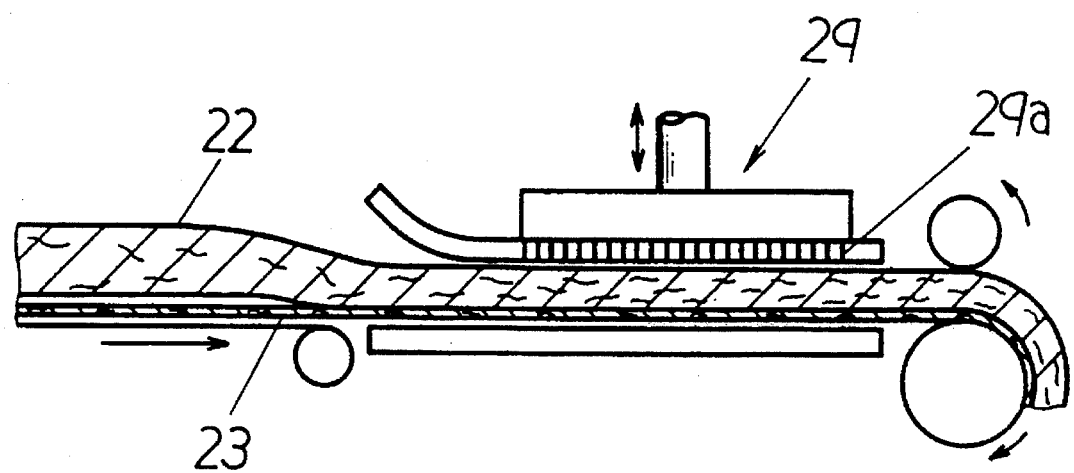
FIG. 10 illustrates a needle punch process that may be performed in the production method of the invention.

As illustrated in FIG. 10, the fibrous web 22 and the nonwoven fabric sheet 23 are integrated by a needle punch 29 having a plurality of needles 29a according to a known needle punching method. The preferred conditions for needle punching are as follows: the needle diameter (needle No.) is 20 to 45; the number of penetrations per square centimeter is 30 to 200 needles/cm², more preferably 45 to 90 needles/cm²; and the needle depth is 5 to 15 mm, more preferably 9 to 13 mm. Owing to needle punching, part of the fiber of the fibrous web 22 is pushed into the nonwoven fabric sheet 23, and, depending on the conditions of needle punching, part of the fiber of the nonwoven fabric sheet 23 is drawn into at least a surface portion of the fibrous web 22, thus being entangled with each other. The nonwoven fabric sheet 23 and the fibrous web 22 are securely bound.

Figure 11:
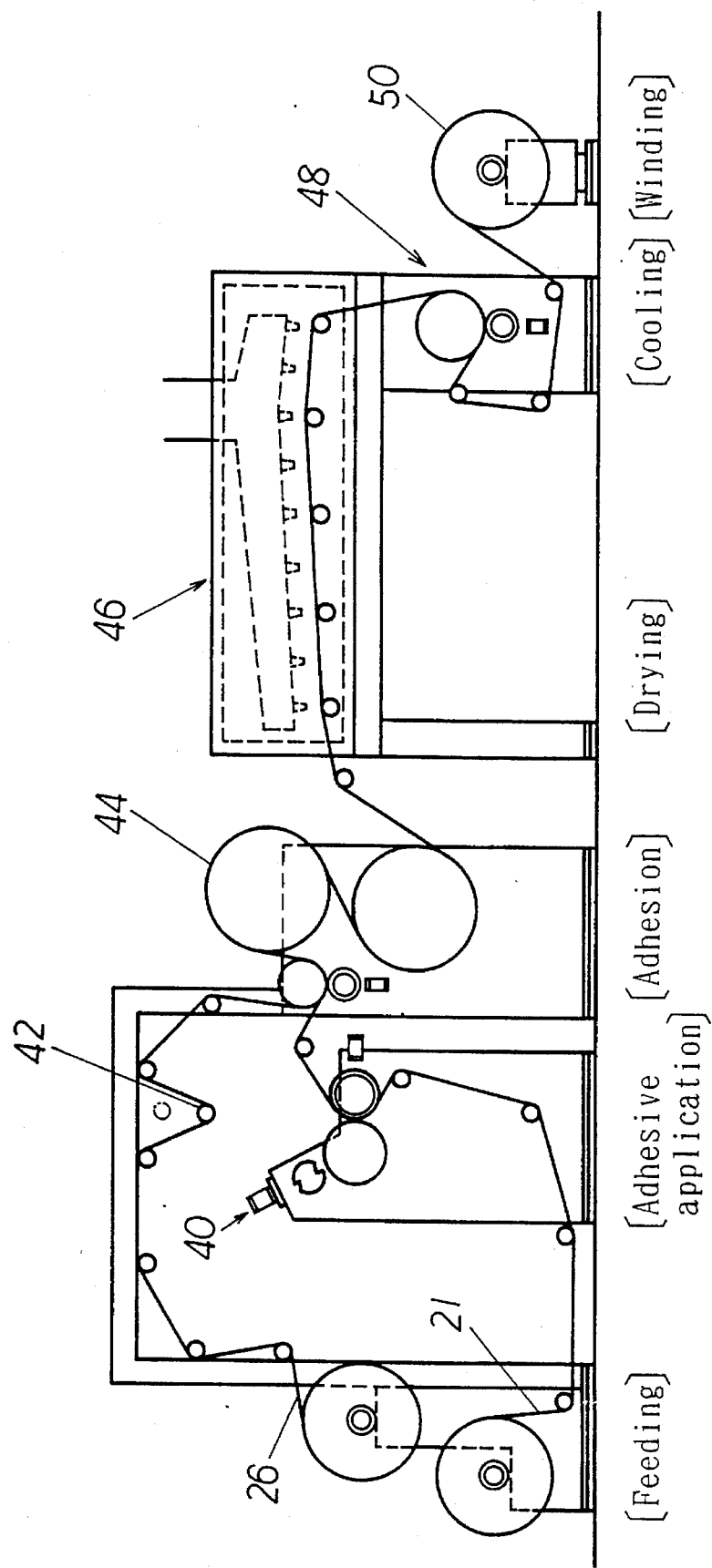
FIG. 11 shows an example laminating system that may be used in the production method of the invention.

An outer material 26 is adhered with an adhesive 25 to the nonwoven-fabric-sheet side of the laminate wadding 21, that the side on which the nonwoven fabric sheet 23 is present. The adhesive 25 may be applied to either the reverse side of the outer material 26 or the nonwoven-fabric-sheet side of the laminate wadding 21, or both. For example, the laminate wadding 21 and the outer material 26 are separately fed into a known laminating system as shown in FIG. 11. The adhesive 25 supplied by a coater head 40 is applied to the laminate wadding 21 by roll coating. The outer material 26 is conveyed via a tension control dancer 42. After the laminate wadding 21 and the outer material 26 are pressed against each other by rolls so that the adhesive 25 permeates into the outer material 26 and/or the laminate wadding 21 including the nonwoven fabric sheet 23, the flexible laminated surface material is heated on a heat drum 44 to set the adhesive 25. The surface material is then dried by a hot-air dryer 46 and cooled by a cool-air feeder 48 before being wound round a winding roll 50.

The adhesive 25 may be of any type as long as it adheres the outer material 26 to the nonwoven-fabric-sheet side of the laminate wadding 21 with a sufficient adhesion strength and as long as it is suitable for the outer material 26. In a preferred arrangement, a water-soluble adhesive, such as the emulsion of acryl-vinyl acetate copolymer, is used because it will produce substantially no poisonous gas during the production or recycling process of the flexible laminated surface material.

Figure 12A:
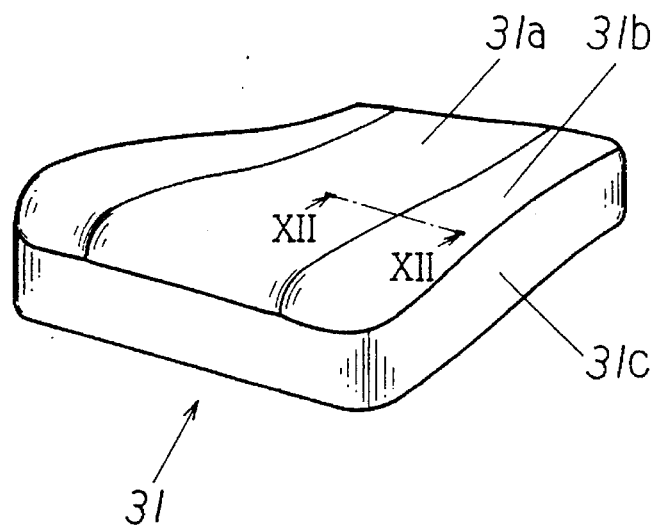
FIGS. 12A is a perspective view of a vehicle seat comprising a seat shell formed of flexible laminated surface materials according to the present invention.
Figure 12B:
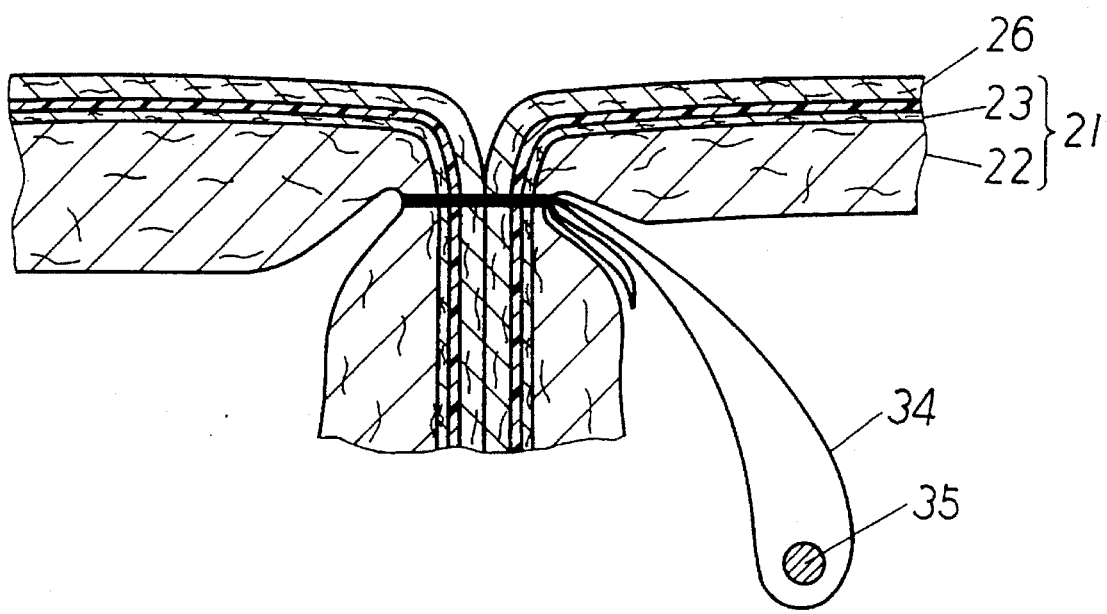
FIG. 12B is a sectional view of the seat shell taken along line XII—XII of FIG. 12A.

The thus-constructed flexible laminated surface material may be suitably used for, for example, the shell of a vehicle seat as shown in FIGS. 12A and 12B. Flexible laminated surface materials comprising fibrous webs 22 of different thicknesses are used for different parts of the seat shell, for example: a fibrous web having a thickness of about 8 mm, for the top central part 31a; a fibrous web having a thickness of about 3 mm, for the top side parts 31b; and a fibrous web having a thickness of 1 mm, for the side skirt 31c. As shown in FIG. 12B, two flexible laminated surface materials of different thicknesses are sewn together with a supportive fabric envelop 34 containing a supportive wire 35.

Thus, the flexible laminated surface material can be handled, that is, cut and sewn and placed to cover the pad material of the seat, generally in the same manner as conventional shell materials. The flexible laminated surface material comprising the laminate wadding 21 provides voluminousness and cushion properties comparable to those properties of a typical flexible laminated surface material comprising a base layer of, for example, polyurethane foam.

The nonwoven fabric sheet 23 substantially retains the fiber of the fibrous web 22 and makes the surface of the laminate wadding 21 relatively regular and firm so as to be suitable for adhesion to the outer material 26, compared with the surface of a fibrous base layer lacking such a nonwoven fabric sheet. Therefore, substantially entire-area adhesion can be formed between the outer material 26 and the laminate wadding 21 including the nonwoven fabric sheet 23, so as to achieve a sufficient adhesion strength. Further, since the nonwoven fabric sheet 23 provided between the outer material 26 and the fibrous web 22 serves also as a reinforcing member, the laminate wadding 21 will obtain a sufficient strength without employing any backing material, even if the outer material 26 is a low area weight fabric. Since low area weight fabrics are usually inexpensive, production costs can be reduced.

Second Embodiment

Figure 2:
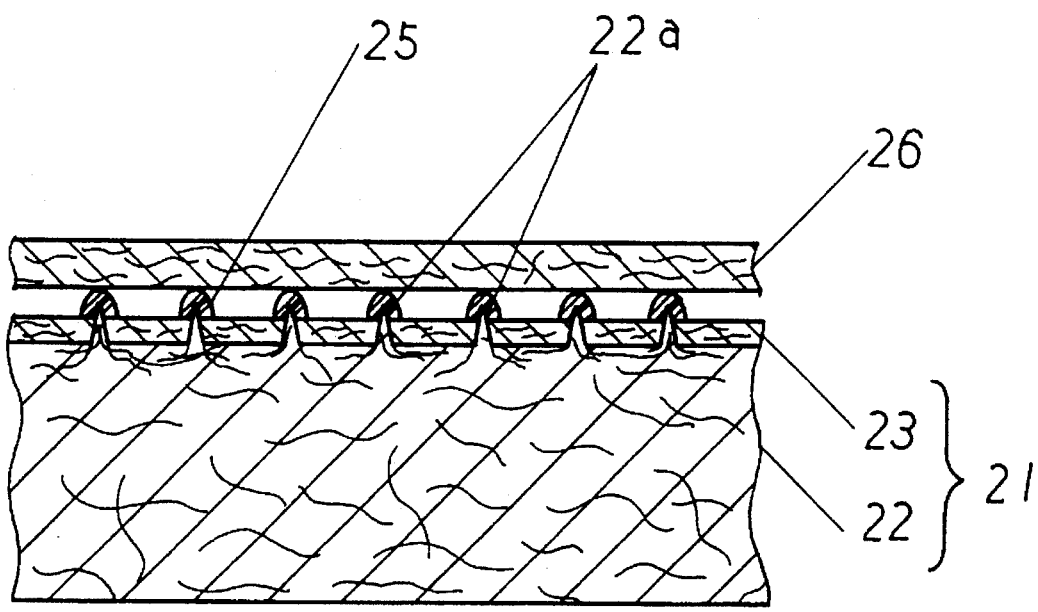
FIG. 2 is a section of a second embodiment of the flexible laminated surface material of the present invention.
Figure 3:
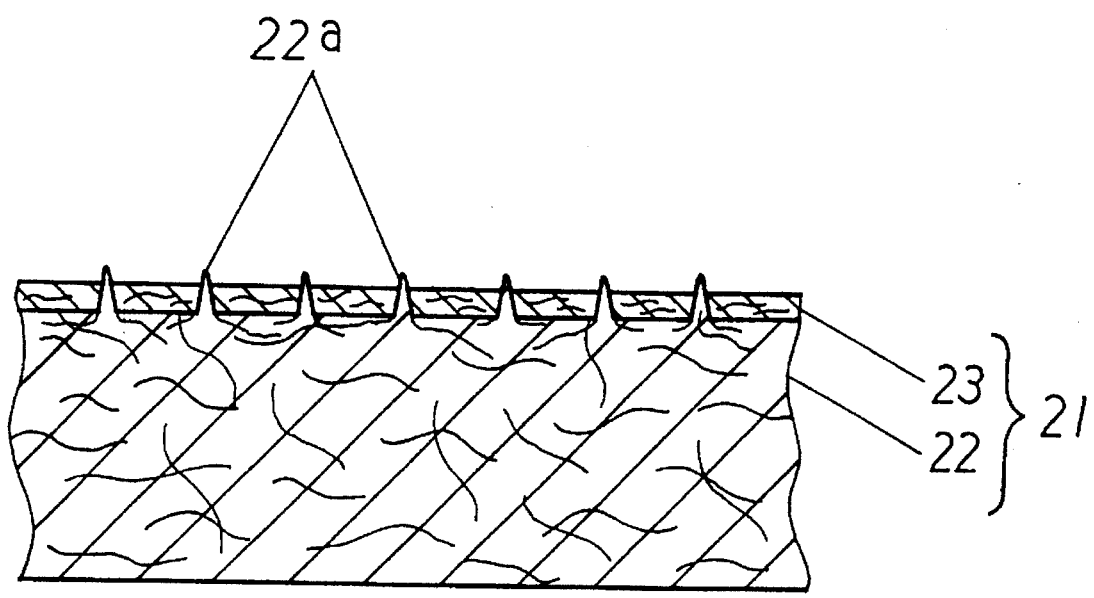
FIG. 3 is a section of a laminate wadding according to the present invention.

A second embodiment of the present invention will be described with reference to FIGS. 2 and 3. According to the second embodiment, an outer material 26 is adhered to a laminate wadding 21 by spot adhesion, instead of the entire-area adhesion as in the first embodiment.

As in the first embodiment, the laminate wadding 21 is made up of a fibrous web 22 and a nonwoven fabric sheet 23 that are integrated by needle punching. The preferred types and ranges of thickness and area weights of the fibrous web 22 and the nonwoven fabric sheet 23 are generally the same as stated in connection with the first embodiment.

As a result of needle punching, part of the fiber of the fibrous web 22 is pushed into the nonwoven fabric sheet 23, and, depending on the conditions of needle punching, part of the fiber of the nonwoven fabric sheet 23 is drawn into a surface portion of the fibrous web 22, as in the first embodiment. In an enlarged view, as shown in FIG. 3, part of the fiber of the fibrous web 22 penetrates through the nonwoven fabric sheet 23 and forms protrusions 22a thereon. The fibrous web 22 and the nonwoven fabric sheet 23 are thus securely interconnected.

The outer material 26 is adhered with an adhesive 25 to the nonwoven-fabric-sheet side of the laminate wadding 21. In the production process, the adhesive 25 is applied by, for example, roll coating, to the nonwoven-fabric-sheet side of the laminate wadding 21, that is, the surface having protrusions 22a, so that substantially only the protrusions 22a and portions of the nonwoven fabric sheet 23 surrounding the protrusions 22a receive the adhesive 25. Then, the laminate wadding 21 and the outer material 26 are placed face to face and pressed against each other by using a rolling apparatus so that the outer material 3 adheres to portions of the laminate wadding 21 that include protrusions 22a and their surrounding portions of the nonwoven fabric sheet 23. The spot adhesion between the outer material 26 and the laminate wadding 21 is thus achieved.

As in the first embodiment, the adhesive 25 may be of any type as long as it achieves a sufficient strength of adhesion between the outer material 26 and the laminate wadding 21. Considering safety of the working place of production and recycling, water-soluble adhesive is preferred, such as emulsion of acryl-vinyl acetate copolymer. However, for the abovedescribed spot adhesion, the amount of the adhesive 25 applied is generally limited to at most 0.03 g/cm$^2$, so as to achieve at least 10 adhesion spots per square centimeter, more preferably 50 to 70 adhesion spots per square centimeter.

The surface sheet according to the second embodiment achieves substantially the same advantages as achieved by the first embodiment. Further, according to the second embodiment, because the spot adhesion enables the outer material 26 to move and stretch relative to the laminate wadding 21, adhesion of the outer material 26 to the laminate wadding 2 does not have a substantially adverse effect on the stretchability or texture of the outer material 26. In addition, since the laminate wadding 21 is adhered by spot adhesion to the outer material 26, the air permeability of the flexible laminated surface material is further increased.

Third Embodiment

Figure 4:
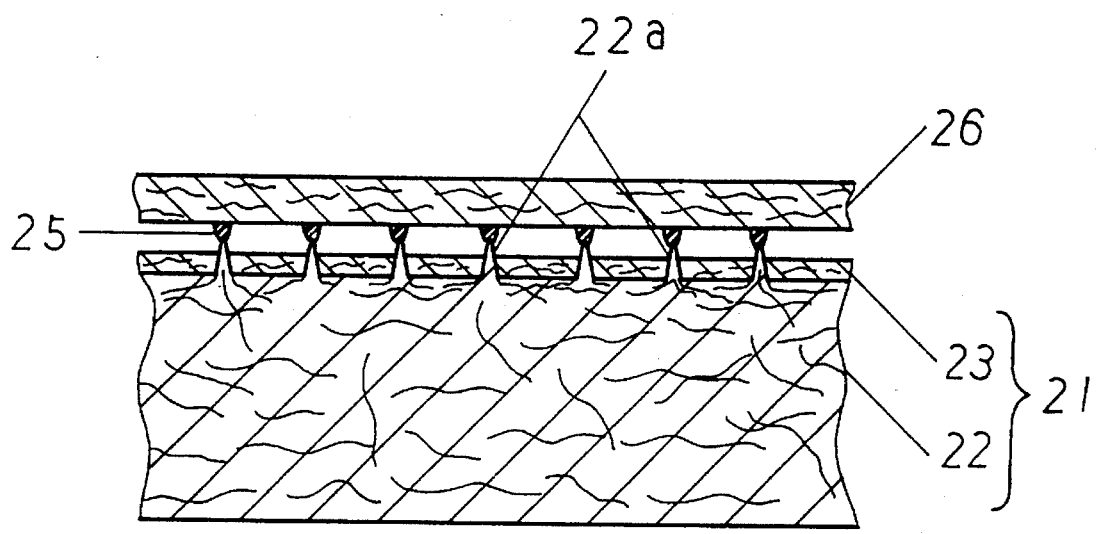
FIG. 4 is a section of a third embodiment of the flexible laminated surface material of the present invention.

A third embodiment is constructed substantially in the same manner as the second embodiment, except that spot adhesion is further specified, as shown in FIG. 4. According to the third embodiment, the outer material 26 is adhered to only peak portions of the protrusions 22a and substantially no portion of the nonwoven fabric sheet 23. To achieve such specific spot adhesion, the adhesive 25 is applied to the protrusions 22a on the nonwoven fabric sheet 23 by, for example, roll coating, and the amount of the adhesive 25 applied is preferably limited to about 0.004 to 0.01 g/cm$^2$.

With this construction, when the outer material 26 is forced away from the laminate wadding 21, the fiber of the fibrous web 22 adhered to the outer material 26 will be drawn out while being retained by the nonwoven fabric sheet 23. The resistance of the outer material 26 to peeling from the laminate wadding 21 is thus enhanced. In addition, the freedom of the outer material 26 for stretching and movements relative to the laminate wadding 21 is increased while a sufficient adhesion strength is achieved.

Figure 6:
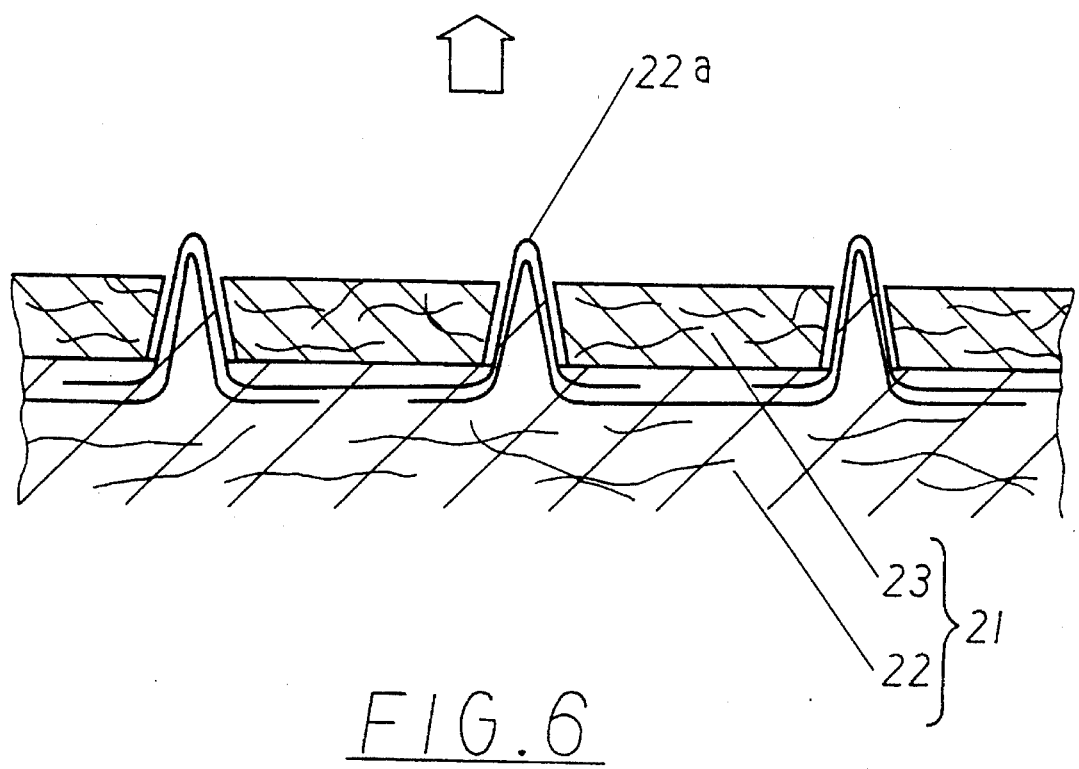
FIG. 6 illustrates the filament interconnection of bundles of loops of filaments protruding from the needle punch pores of the supportive sheet according to the invention.

Increased binding and stretchability by the above-described spot adhesion will be more specifically explained with reference to FIGS. 6 to 9C. As illustrated in FIG. 6, the protrusions 22a are composed of loop bundles of filaments of the fibrous web 22 protruding from the needle-punch pores of the nonwoven fabric sheet 23. In an enlarged view, a single filament of the fibrous web 22 protrudes from a plurality of neighboring pores of the nonwoven fabric sheet 23, forming a plurality of loops. Thus, the protrusions 22a, or the bundles of loops, are interconnected by filaments extending beneath the nonwoven fabric sheet 23. Although not explicitly illustrated in the drawings, the filaments of the nonwoven fabric sheet 23 are entangled with the filaments of the fibrous web 22 by needle punching as stated above. If a bundle of loops protruding from a single pore are drawn out as indicated by the arrow in FIG. 6, loops of the adjacent protrusions 22a are drawn in beneath the nonwoven fabric sheet 23 through the respective pores. Although the filaments of the fibrous web 22 are retained with a considerable strength by the nonwoven fabric sheet 23 and the friction between the filaments of the fibrous web 22 and the nonwoven fabric sheet 23, the bundle of filaments will be completely pulled out or broken apart by a certain force.

Figure 7:
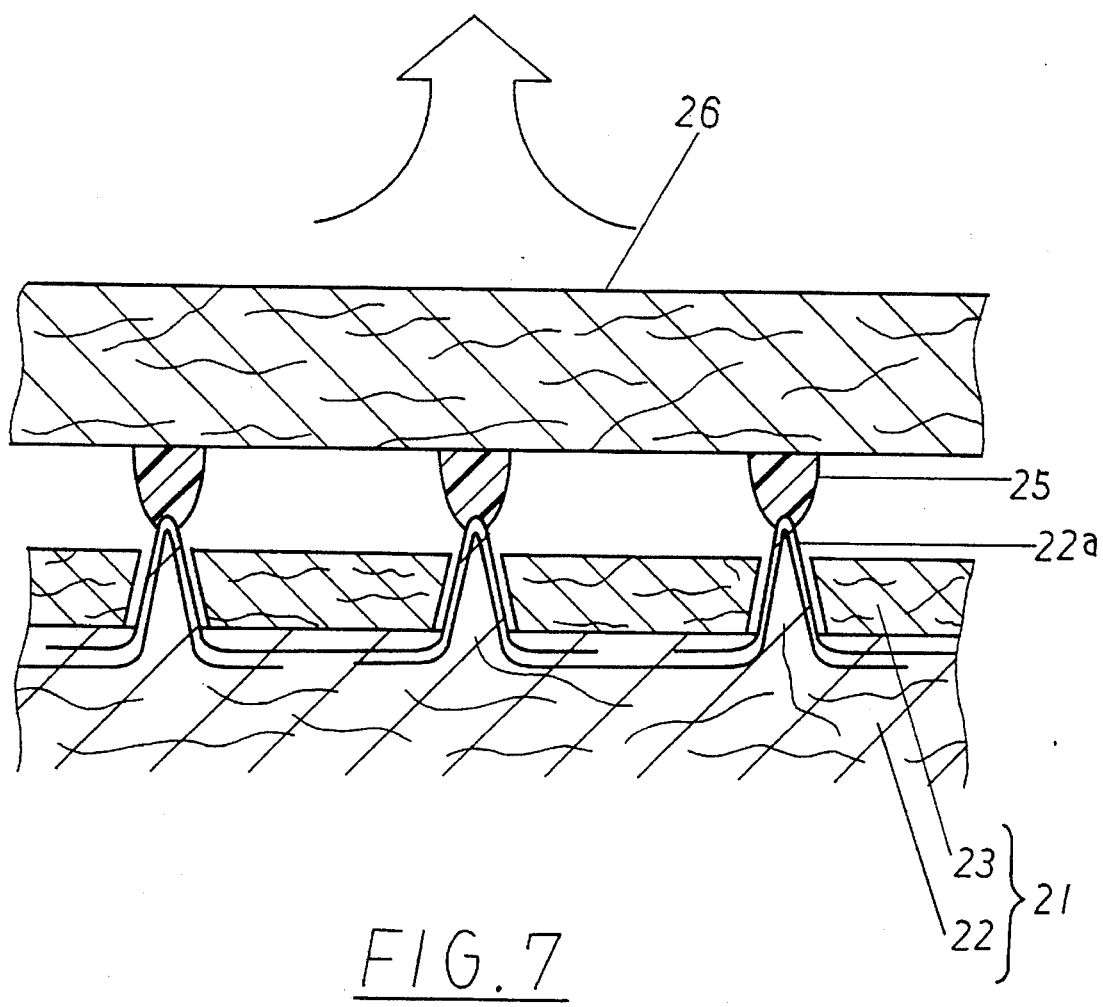
FIG. 7 illustrates the mechanism of binding between the laminate wadding and the outer material in spot adhesion according to the invention.
Figure 8A:
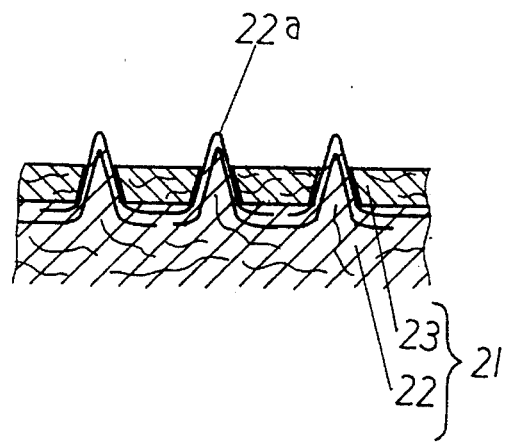
FIGS. 8A to 8C illustrate the stretchability of a laminate wadding according to the invention.
Figure 8B:
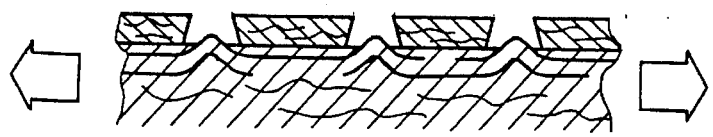
Figure 8C:
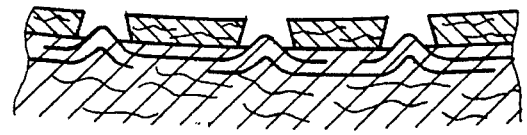

In the spot adhesion according to the second and third embodiments, where the loops of filaments of fibrous web 22 are adhered to the outer material 26, the adhesion spots are interconnected by the filaments of the fibrous web 22 extending beneath the nonwoven fabric sheet 23, as shown in FIG. 7. If the outer material 26 is pulled away from the laminate wadding 21 as indicated by the arrow in FIG. 7, some bundles of loops are pulled out to some extent and some other bundles of loops surrounding the pulled-out bundles of loops are pulled in to some extent while the filaments of the fibrous web 22 are restrained from loosening apart by the nonwoven fabric sheet 23, which is anchored into the fibrous web 22 by fiber entanglement. The peeling force is thus dispersed. Owing to the retention of the filaments of fibrous web 22 by the nonwoven fabric sheet 23 and the dispersion of peeling impacts by the filament interconnection of adhesion spots, the construction including the spot adhesion according to the second and third embodiments achieves substantially strong binding between the laminate wadding 21 and the outer material 26.

Figure 9A:
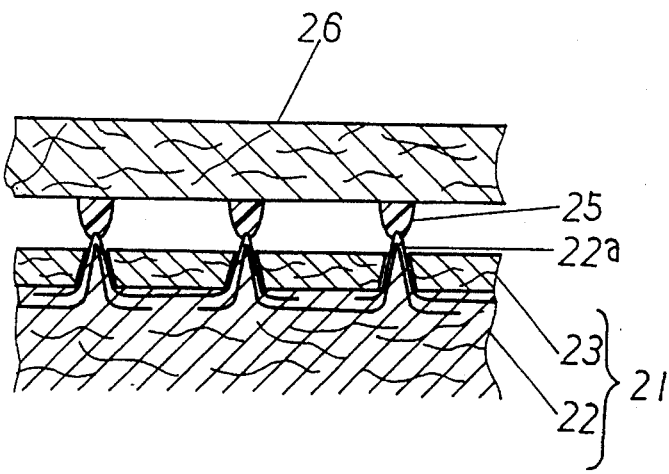
FIGS. 9A to 9C illustrate the stretchability of a flexible laminated surface material employing spot adhesion according to the invention.
Figure 9B:
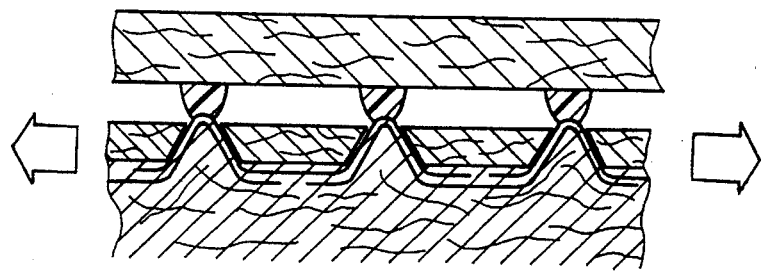
Figure 9C:
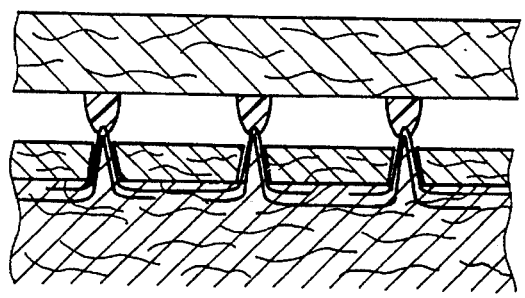

With reference to FIGS. 8A through 9C, increased stretchability will be explained. If the laminate wadding 21 alone (FIG. 8A) is stretched, the loops of filaments of the fibrous web 22 are drawn out from the needle punch pore of the nonwoven fabric sheet 23, and the filaments are somewhat straightened (FIG. 8B). The filaments will not return from the somewhat straightened state to the original looped state when the stretching force is discontinued (FIG. 8C). However, in the construction according to the third embodiment, in which only the bundles of loops are adhered to the outer material 26 (FIG. 9A), the loops will not be completely drawn out from the needle punch pores if the flexible laminated surface material is stretched (FIG. 9B). When the stretching force is discontinued, the filaments will return from the somewhat straightened state to the original looped state (FIG. 9C). Thus, the looped filaments interconnecting the adhesion spots follow stretching and restoration of the surface laminated material, in particular, the outer material 26. Further, because the nonwoven fabric sheet 23 is provided with dot embosses, the dot embosses also contribute to the stretchability enhancement achieved by the third embodiment.

As understood from the above description in connection with the first, second and third embodiments, the construction of a laminate wadding according to the present invention enables at least three different types of adhesion between the laminate wadding 21 and the outer material 26, generally by controlling the amount of adhesive applied and the roll clearance in roll coating According to the present invention, many modifications of any one of the above embodiments are possible, as explained below.

Figure 5:
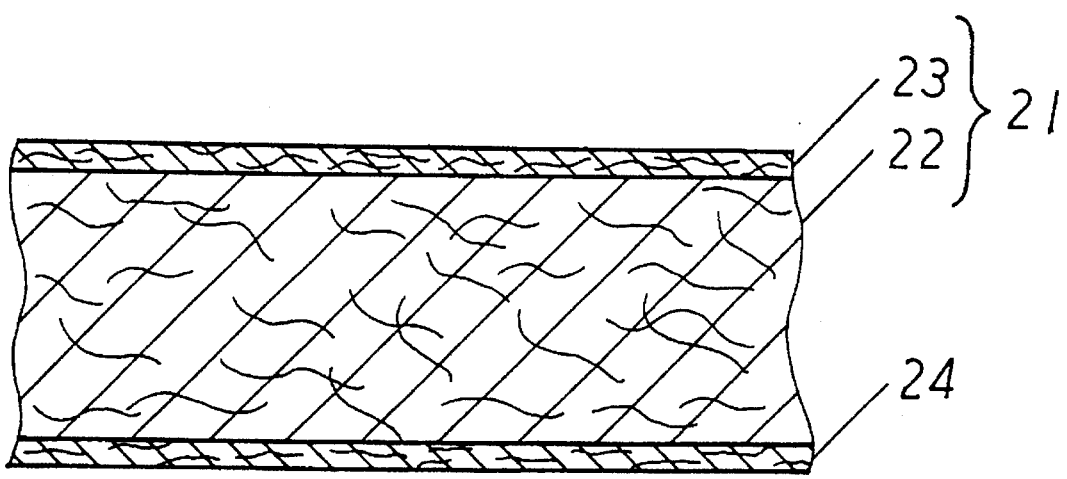
FIG. 5 is a sectional view of a modification of the laminate wadding according to the present invention, which comprises a backing material.

To enhance the durability and strength of the laminate wadding 21, a flexible laminated surface material according to any one of the above-described embodiments may further comprise a backing sheet 24 attached to the fibrous web 22, to the side thereof remote from the nonwoven fabric sheet 23, as shown in FIG. 5. The backing sheet 24 is preferably a nonwoven fabric sheet formed of long filaments, because such a nonwoven fabric backing sheet 24 can be integrated with the fibrous web 22 and nonwoven fabric sheet 23 by needle punching in one step. However, the backing sheet 24 may be of other types.

A flame-retardant nonwoven fabric sheet 23 that is flame retardant by itself or treated for flame retardation may be employed. Then, the flame retardation of the laminate wadding 21 can be readily obtained without having to employ a flame-retardant fibrous web 22 or treat the fibrous web 22 for flame retardation.

Various types of fibrous web 22 may be employed in accordance with requirements, for example: a web of hollow fiber and regular fiber, for a voluminous texture; a web of thermo-fusing fiber composed of high melting point and low melting point components, for strength enhancement; or a web of untangled composite fiber crimped at a rate of 3–20 per inch, for enhancement of impact resiliency.

Figure 13A:
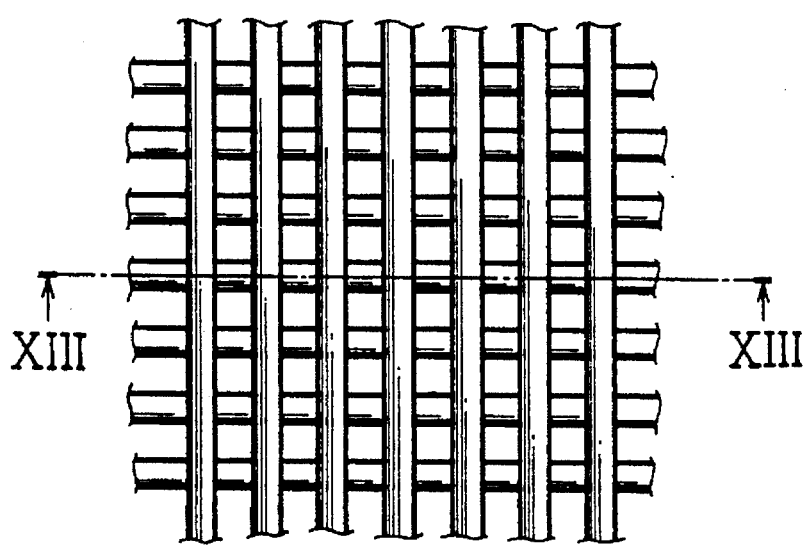
FIG. 13A is a plan view of a crossed filament nonwoven sheet that may be used instead of a nonwoven fabric sheet, according to the present invention.
Figure 13B:
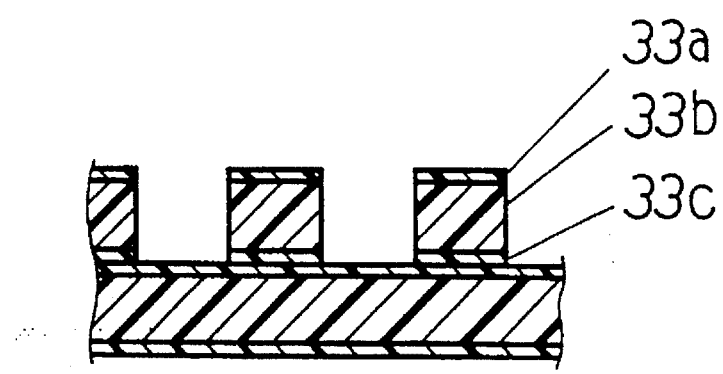
FIG. 13B is a sectional view taken along line XIII—XIII of FIG. 13A.

Although the above embodiments are described in connection with the nonwoven fabric sheet 23 such as "Spunbonded", other types of sheets, such as a crossed filament nonwoven sheet as shown in FIGS. 13A and 13B, may be used unless they disable the above-described construction of the laminate wadding 2 as achieved by needle punching. The crossed filament nonwoven sheet is formed of polymer filaments each comprising three layers: a top layer $33a$ of a low melting point polymer; an intermediate layer $33b$ of a high melting point polymer; and a bottom layer $33c$ of a low melting point polymer. The filaments are arranged in the form of a grid in which the longitudinal and lateral filaments are hot-fused to each other.

Although the above embodiments are described in connection with needle punching, water jetting or other methods may instead be used to integrate the nonwoven fabric sheet 23 and the fibrous web 22.

Figure 14:
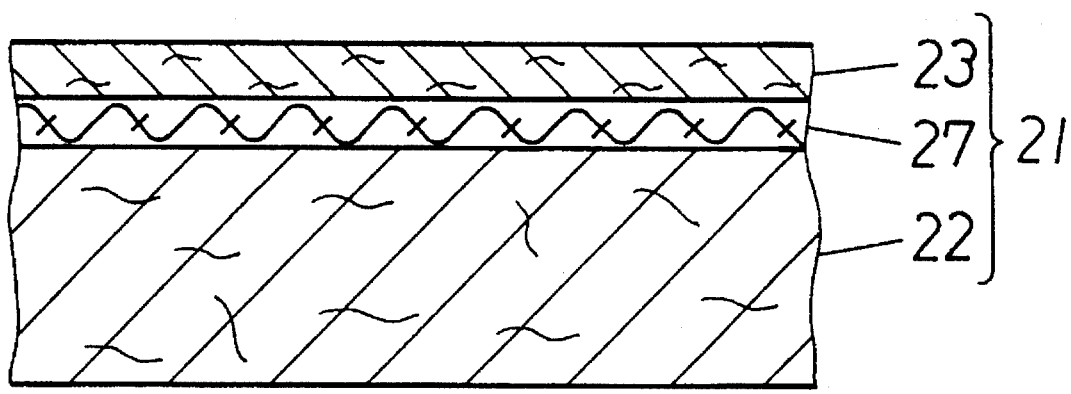
FIG. 14 is a sectional view of another modification of the laminate wadding according to the present invention, which further comprises a reinforcing material.

Further, as shown in FIG. 14, the laminate wadding 21 may further comprise a reinforcing material 27 provided between the supportive sheet, such as the nonwoven fabric sheet 23, and the fibrous web 22, to enhance or adjust the strengths in the longitudinal, lateral or bias directions. The reinforcing material 27 can be easily incorporated by needle-punching it together with the non-woven fabric sheet 23 and the fibrous web 22. The reinforcing member 27 may be a vegetable-fiber shirting sheet, a plastic net, or the like.

The outer material 26 adhered to the laminate wadding 21 may be of any type as long as it has a required level of abrasion resistance, for example, fabric outer materials such as woven sheets, knitted sheets or nonwoven fabric sheets. It is preferable to use an environmentally "clean" outer material, that is, an outer material that will not substantially hinder recycling of the flexible laminated surface material. Because employment of the nonwoven fabric sheet 23 integrated with the fibrous web 22 provides sufficient strengths in the longitudinal, lateral and bias directions, it is possible to use a low area weight outer material of about 0.023 to 0.036 $g/cm^2$, which is considered to be too weak to use in a flexible laminated surface material according to the conventional art.

Although roll coating is employed to apply an adhesive according to the above embodiments, spray coating or other methods may instead be employed.

While the present invention has been described with reference to the preferred embodiments thereof, it is to be understood that the invention is not limited to the disclosed embodiments. To the contrary, the invention is intended to cover various modifications and equivalent arrangements included within the spirit and scope of the appended claims.

The scope of the following claims is to be accorded the broadest interpretation so as to encompass all such modifications and equivalent structures and functions.

What is claimed is:

1. A flexible laminated surface material comprising:
   a laminate wadding comprising a fibrous web and a supportive sheet that are laminated and integrated by entangling a fiber of the fibrous web and a fiber of the supportive sheet with each other, an apparent density of the supportive sheet being higher than an apparent density of fibrous web; and
   an outer material adhered to a supportive-sheet side of the laminate wadding so that the supportive sheet is substantially sandwiched between the outer material and the fibrous web,
   wherein said fibrous web includes fiber protrusions that protrude through the supportive sheet, the fiber protrusions being adhered to the outer material.

2. The flexible laminated surface material according to claim 1, wherein the flexible laminated surface material is adapted for use as a vehicle seat.

3. The flexible laminated surface material according to claim 1, wherein at least the supportive sheet integrated with the fibrous web is flame-retardant.

4. The flexible laminated surface material according to claim 3, wherein the fibrous web is not flame-retardant.

5. The flexible laminated surface material according to claim 1, wherein the supportive sheet is a nonwoven fabric sheet.

6. The flexible laminated surface material according to claim 1, further comprising a backing material fixed to a side of the laminate wadding by entangling the fiber of backing material and the fiber of the laminate wadding, the side being remote from the supportive sheet integrated with the fibrous web.

7. The flexible laminated surface material according to claim 6, wherein the backing material is a nonwoven fabric sheet.

8. The flexible laminated surface material according to claim 1, further comprising a reinforcing material disposed between the fibrous web and the supportive sheet.

9. The flexible laminated surface material according to claim 8, wherein the reinforcing material is one of a shirting sheet and a plastic net.

10. The flexible laminated surface material according to claim 1, wherein the outer material is adhered to the laminate wadding at a plurality of spots, at each of which a portion of the outer material is adhered to a portion of the laminate wadding.

11. The flexible laminated surface material according to claim 10, wherein substantially only said fiber protrusions of the and portions of the supportive sheet surrounding the fiber protrusions are adhered to said outer material.

12. The flexible laminated surface material according to claim 10, wherein said portion of the laminate wadding is only a peak portion of a each of said fiber protrusion formed of the fibrous web protrusions.

13. The flexible laminated surface material according to claim 10, wherein said outer material is adhered to the laminate wadding using about 50–70 adhesion spots/cm$^2$.

14. The flexible laminated surface material according to claim 10, wherein the amount of the adhesive used between the outer material and the laminate wadding at a plurality of spots is not more than 0.03 g/cm$^2$.

15. The flexible laminated surface material according to claim 1, wherein the supportive sheet is thinner than the fibrous web.

16. The flexible laminated surface material according to claim 15, wherein the supportive sheet has a thickness of about 0.1 to 2.0 mm and the fibrous web has a thickness of about 1.0 to 20 mm.

17. The flexible laminated surface material according to claim 16, wherein the area weight of the supportive sheet is about 0.001 to 0.02 g/cm$^2$, and the area weight of the fibrous web is about 0.005 to 0.1 g/cm$^2$.

18. The flexible laminated surface material according to claim 1, wherein the outer material is adhered to the laminated wadding with a water-soluble adhesive.

19. The flexible laminated surface material according to claim 1, wherein the outer material is adhered to the laminate wadding by placing an adhesive on surfaces of both the laminate wadding and the outer material.

20. A flexible surface material comprising:
   an entangled laminate wadding comprising a fibrous web and a supportive sheet, an apparent density of the supportive sheet being higher than an apparent density of fibrous web; and
   an outer material adhered to said laminate wadding, said supportive sheet being disposed between said outer material and said fibrous web,
   wherein said fibrous web includes fiber protrusions that protrude through the supportive sheet, the fiber protrusions being adhered to the outer material.

21. The flexible surface material of claim 20, wherein the outer material has an area weight of about 0.023 to 0.036 g/cm$^2$.

22. A method of producing a flexible laminated surface material, comprising the steps of:
   integrating a supportive sheet with a fibrous web by entangling a fiber of the supportive sheet and a fiber of the fibrous web with each other to form a laminate wadding, the fibrous web including fiber protrusions that protrude through the supportive sheet, an apparent density of the supportive sheet being higher than an apparent density of fibrous web; and
   adhering an outer material to a supportive-sheet side of the laminate wadding by pressing the outer material and the laminate wadding against each other so that the supportive sheet is substantially sandwiched between the outer material and the laminate wadding, said adhering step including adhering the fiber protrusions to the outer material.

23. The method of producing a flexible laminated surface material according to claim 20, wherein the step of integrating includes needle punching the supportive sheet with the fibrous web.

24. The method of producing a flexible laminated surface material according to claim 23, further comprising performing said needle punching with a number of penetrations being within the range of 30 to 200 needles/cm$^2$ and with a needle depth being within the range of 5 to 15 mm.

25. The method of producing a flexible laminated surface material according to claim 22, wherein the integrating step includes substantially fixing a reinforcing material between the supportive sheet and the fibrous web by entangling fiber of the supportive sheet and fiber of the fibrous web with each other.

26. The method of producing a flexible laminated surface material according to claim 22, further including applying adhesive to the supportive-sheet side of the laminate wadding before pressing the outer material and the laminate wadding against each other.

27. The method of producing a flexible laminated surface material according to claim 26, further including applying adhesive to the outer material.

28. The method of producing a flexible laminated surface material according to claim 26, wherein said applying step includes applying a water-soluble adhesive.

29. The method of producing a flexible laminated surface material according to claim 26, wherein the applying step includes applying the adhesive by roll coating.

30. The method of producing a flexible laminated surface material according to claim 22, wherein the adhering step includes adhering only said fiber protrusions and portions of the supportive sheet surrounding the protrusions to the fiber outer material.

31. The method of producing a flexible laminated surface material according to claim 22, wherein the adhering step includes adhering only peak portions of said fiber protrusions to the outer material.

32. The method of producing a flexible laminated surface material according to claim 22, wherein said outer material is adhered to said laminate wadding using about 50–70 adhesion spots/cm$^2$.

* * * * *